US011121507B2

(12) United States Patent
Hou et al.

(10) Patent No.: US 11,121,507 B2
(45) Date of Patent: Sep. 14, 2021

(54) ELECTRICAL CONNECTOR WITH THE TAIL SEGMENT OF THE SECOND TERMINAL OF THE SHIELDING PLATE AND THE TAIL SEGMENTS OF THE FIRST TERMINALS ARRANGED IN A SAME ROW

(71) Applicant: Advanced Connectek Inc., New Taipei (TW)

(72) Inventors: Pin-Yuan Hou, New Taipei (TW); Yu-Lun Tsai, New Taipei (TW); Hsu-Fen Wang, New Taipei (TW); Yu-Chai Yeh, New Taipei (TW)

(73) Assignee: Advanced Connectek Inc., New Taipei (TW)

( * ) Notice: Subject to any disclaimer, the term of this patent is extended or adjusted under 35 U.S.C. 154(b) by 32 days.

(21) Appl. No.: 16/247,588

(22) Filed: Jan. 15, 2019

(65) Prior Publication Data
US 2019/0221972 A1  Jul. 18, 2019

(30) Foreign Application Priority Data

Jan. 15, 2018  (TW) .................................. 107200685

(51) Int. Cl.
*H01R 13/6585* (2011.01)
*H01R 13/6596* (2011.01)
(Continued)

(52) U.S. Cl.
CPC ..... *H01R 13/6585* (2013.01); *G06F 13/4068* (2013.01); *G06F 13/4282* (2013.01);
(Continued)

(58) Field of Classification Search
CPC .... H01R 13/6581–6598; H01R 13/658; H01R 13/6273; H01R 13/6461–6474;
(Continued)

(56) References Cited

U.S. PATENT DOCUMENTS 7,285,020 B2 * 10/2007 Riku ...................... H01R 24/62
439/620.21
8,721,361 B2 * 5/2014 Wu ....................... H01R 13/405
439/497
(Continued)

FOREIGN PATENT DOCUMENTS

CN          105470734        4/2016

OTHER PUBLICATIONS

Patent Translate Description CN 105470734. (Year: 2016).*

*Primary Examiner* — Edwin A. Leon
*Assistant Examiner* — Milagros Jeancharles
(74) *Attorney, Agent, or Firm* — JCIPRNET (57) ABSTRACT

An electrical connector including a base member and a plurality of first terminals disposed in the base member is provided. Each of the first terminals has an contact segment and an tail segment opposite to each other. The contact segments respectively belong to two different parallel planes, and the tail segments are located on a same plane. The first terminals form a plurality of terminal sets in the tail segments, and each of the terminal sets includes a ground terminal, a pair of super speed differential terminals, and a power terminal which are adjacent to each other and are sequentially arranged.

18 Claims, 8 Drawing Sheets

(51) Int. Cl.
  *H01R 12/71* (2011.01)
  *H01R 13/6597* (2011.01)
  *G06F 13/42* (2006.01)
  *G06F 13/40* (2006.01)
  *H01R 12/70* (2011.01)
  *H01R 12/72* (2011.01)

(52) U.S. Cl.
  CPC ......... *H01R 12/7064* (2013.01); *H01R 12/71* (2013.01); *H01R 12/721* (2013.01); *H01R 13/6596* (2013.01); *H01R 13/6597* (2013.01); *G06F 2213/0042* (2013.01)

(58) Field of Classification Search
  CPC . H01R 12/71; H01R 12/7064; G06F 13/4068; G06F 13/4282; G06F 2213/0042
  See application file for complete search history.

(56) References Cited

U.S. PATENT DOCUMENTS

| | | | | |
|---|---|---|---|---|
| 8,840,322 | B2* | 9/2014 | Lin | G02B 6/3821 385/90 |
| 9,281,604 | B2* | 3/2016 | Zhang | H01R 13/41 |
| 9,306,345 | B2* | 4/2016 | Hsu | H01R 13/6582 |
| 9,450,337 | B2* | 9/2016 | Kao | H01R 13/6461 |
| 9,515,405 | B2* | 12/2016 | Zhao | H01R 13/405 |
| 9,755,348 | B2* | 9/2017 | Guo | H01R 12/7064 |
| 9,960,543 | B2* | 5/2018 | Chen | B29C 70/72 |
| 10,084,244 | B1* | 9/2018 | Chang | H01R 13/506 |
| 10,608,358 | B2* | 3/2020 | Hou | H01R 12/775 |
| 2004/0092143 | A1* | 5/2004 | Fromm | H01R 13/6477 439/108 |
| 2004/0180577 | A1* | 9/2004 | Zhang | H01R 13/506 439/607.04 |
| 2008/0020654 | A1* | 1/2008 | He | H01R 13/658 439/855 |
| 2008/0038951 | A1* | 2/2008 | He | H01R 12/707 439/260 |
| 2009/0227147 | A1* | 9/2009 | Momose | H05K 1/0216 439/638 |
| 2012/0231675 | A1* | 9/2012 | Zhang | H01R 13/6594 439/682 |
| 2015/0194772 | A1* | 7/2015 | Little | H01R 13/6597 439/357 |
| 2015/0270646 | A1* | 9/2015 | Kao | H01R 13/6581 439/76.1 |
| 2016/0013592 | A1* | 1/2016 | Kao | H01R 13/6471 439/607.55 |
| 2016/0028190 | A1* | 1/2016 | Chen | H01R 12/57 439/607.01 |
| 2016/0064866 | A1* | 3/2016 | Kao | H01R 13/6471 439/676 |
| 2016/0099526 | A1* | 4/2016 | Chen | H01R 43/16 439/607.05 |
| 2016/0111821 | A1* | 4/2016 | Lan | H01R 13/646 439/607.01 |
| 2016/0118752 | A1* | 4/2016 | Guo | H01R 13/6585 439/78 |
| 2016/0181743 | A1* | 6/2016 | Tsai | H01R 13/5202 439/587 |
| 2017/0077654 | A1* | 3/2017 | Yao | H01R 13/6594 |
| 2017/0110818 | A1* | 4/2017 | Guo | H01R 12/716 |
| 2017/0256881 | A1* | 9/2017 | Lambie | H01R 13/5219 |
| 2018/0138621 | A1* | 5/2018 | Zhao | H01R 13/648 |
| 2018/0143927 | A1* | 5/2018 | Kim | G06F 9/4415 |
| 2018/0175560 | A1* | 6/2018 | Zhang | H01R 12/716 |
| 2018/0191092 | A1* | 7/2018 | Zhou | H01R 12/716 |
| 2019/0165507 | A1* | 5/2019 | Hou | H01R 24/60 |
| 2020/0235517 | A1* | 7/2020 | Tsai | H01R 13/6474 |
| 2020/0235535 | A1* | 7/2020 | Tsai | H01R 13/42 |

* cited by examiner

ELECTRICAL CONNECTOR WITH THE TAIL SEGMENT OF THE SECOND TERMINAL OF THE SHIELDING PLATE AND THE TAIL SEGMENTS OF THE FIRST TERMINALS ARRANGED IN A SAME ROW

CROSS-REFERENCE TO RELATED APPLICATION

This application claims the priority benefit of Taiwan patent application serial no. 107200685, filed on Jan. 15, 2018. The entirety of the above-mentioned patent application is hereby incorporated by reference herein and made a part of the specification.

BACKGROUND OF THE INVENTION

Field of the Invention

The disclosure relates to an electrical connector.

Description of Related Art

In recent years, as people's demands for the transmission rate and storage capacity become higher and higher, the USB 3.1 Super Speed+ specification of the USB transmission rate has been developed. Particularly, the new USB Type-C specification provides a maximum transmission rate as high as 10 Gbps and achieves a higher transmission rate when transmitting large-size files, thus effectively reducing a transmission time.

As the transmission rate of a high speed transmission interface becomes significantly improved, conducting terminals are increased and are densely distributed. On current USB interfaces, since conductive metal conductors are spatially arranged to be very close to each other, capacitive coupling is inevitably increased in signal transmission, which increases disturbance in signal transmission and reduces stability in signal transmission. Moreover, impedance mismatch disturbs signal transmission and meanwhile reduces stability in signal transmission, thus causing defects such as poor quality of use and unstable signals.

Accordingly, how to provide an appropriate terminal configuration to accommodate the transmission rate of the new specification and meanwhile develop an electrical connector towards a design trend of miniaturization and convenience of use is one of the issues that attract attention from people skilled in the art.

SUMMARY OF THE INVENTION

The embodiments of the invention provide an electrical connector that effectively prevents disturbance in high speed signal transmission through a configuration of terminals in tail segments.

An electrical connector according to an embodiment of the invention includes a base member and a plurality of first terminals disposed in the base member. Each of the first terminals includes an contact segment and an tail segment opposite to each other. The electrical connector is removably connected to an external electronic device via the contact segments. The contact segments respectively belong to two different parallel planes, and the tail segments are located on a same plane. The first terminals form a plurality of terminal sets in the tail segments, and each of the terminal sets includes a ground terminal, a pair of super speed differential terminals, and a power terminal which are adjacent to each other and are sequentially arranged.

In an embodiment of the invention, the terminals of each of the terminal sets are arranged at an equal interval.

In an embodiment of the invention, the pair of super speed differential terminals is a pair of Tx+/Tx− terminals or a pair of Rx+/Rx− terminals.

In an embodiment of the invention, the electrical connector is a USB Type-C connector.

In an embodiment of the invention, the first terminals further include a plurality of pairs of USB 2.0 differential terminals, a plurality of configuration channel (CC) terminals, and a plurality of sideband use (SBU) terminals, and the terminal sets are located on two opposite sides of the plurality of pairs of USB 2.0 differential terminals, the plurality of configuration channel terminals, and the plurality of sideband use terminals.

In an embodiment of the invention, the terminal sets are symmetrically located on two sides of the tail segments.

In an embodiment of the invention, the contact segments and the tail segments are located on a same plane.

In an embodiment of the invention, the electrical connector further includes a shielding plate disposed on the base member and located between the two different planes on which the contact segments are located. The shielding plate includes at least one second terminal coaxially arranged on the same plane with the tail segments of the first terminals.

In an embodiment of the invention, the shielding plate includes a pair of second terminals located on two opposite sides of the tail segments.

In an embodiment of the invention, the base member includes a first portion and a second portion. A part of the first terminals pass through the first portion, the first portion includes a seat, and the tail segments are located on the seat. The second portion is assembled to the first portion and exposes the seat. Another part of the first terminals pass through the second portion.

In an embodiment of the invention, the first portion includes a plurality of spacers disposed on the seat, and the tail segments are spaced apart by the spacers.

In an embodiment of the invention, the electrical connector further includes a shielding plate sandwiched between the first portion and the second portion. The base member has a recess, and the shielding plate includes a lateral wing located in the recess and exposed out of the base member.

In an embodiment of the invention, the electrical connector further includes a first shielding shell fit around and covering the base member and the shielding plate, and the first shielding shell electrically abuts against the lateral wing.

In an embodiment of the invention, the electrical connector further includes a second shielding shell fit around a tongue of the first portion, a tongue of the second portion, and a tongue of the shielding plate. The second shielding shell is located inside the first shielding shell and electrically abuts against the first shielding shell.

Accordingly, in the electrical connector, the terminals are specifically configured in the tail segments. Namely, in the arrangement axial direction of the tail segments, the two opposite sides of the super speed differential terminals are first disposed with the power terminal and the ground terminal rather than other terminals (i.e., forming the plurality of terminal sets in the tail segments). Moreover, each terminal set is formed of the ground terminal, the super speed differential terminals, and the power terminal that are sequentially arranged. Accordingly, since the super speed differential terminals are disposed between the ground terminal and the power terminal, disturbance of the power signal and other noise, which may cause signal distortion or affect properties of high-frequency signals, can thus be effectively prevented.

To provide a further understanding of the aforementioned and other features and advantages of the disclosure, exemplary embodiments, together with the reference drawings, are described in detail below.

DESCRIPTION OF THE EMBODIMENTS

Figure 1:
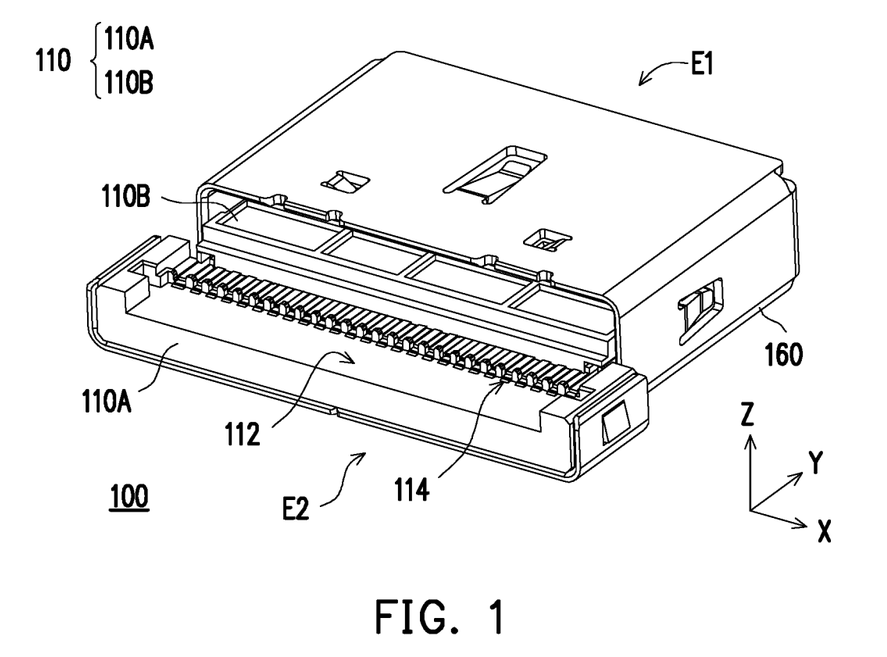
FIG. 1 and FIG. 2 respectively illustrate an electrical connector according to an embodiment of the invention from different viewing angles.
Figure 2:
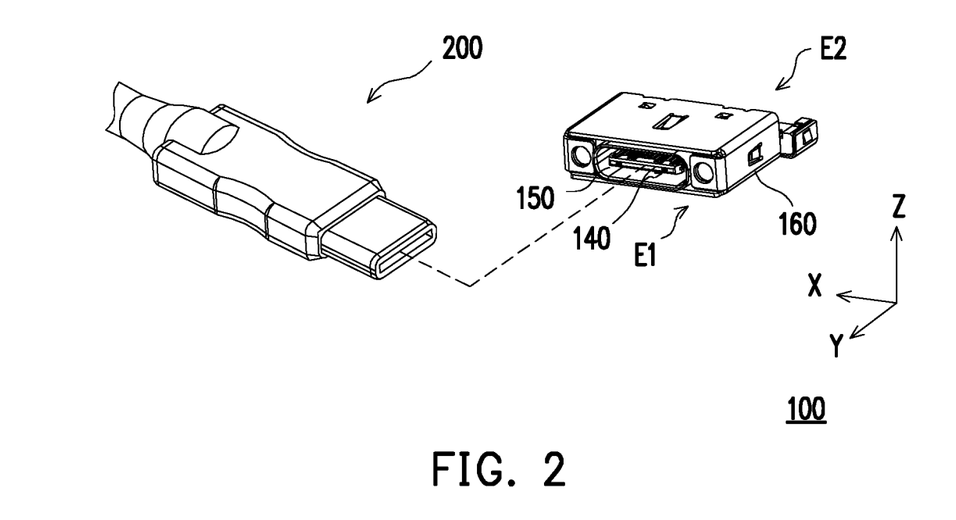
Figure 3:
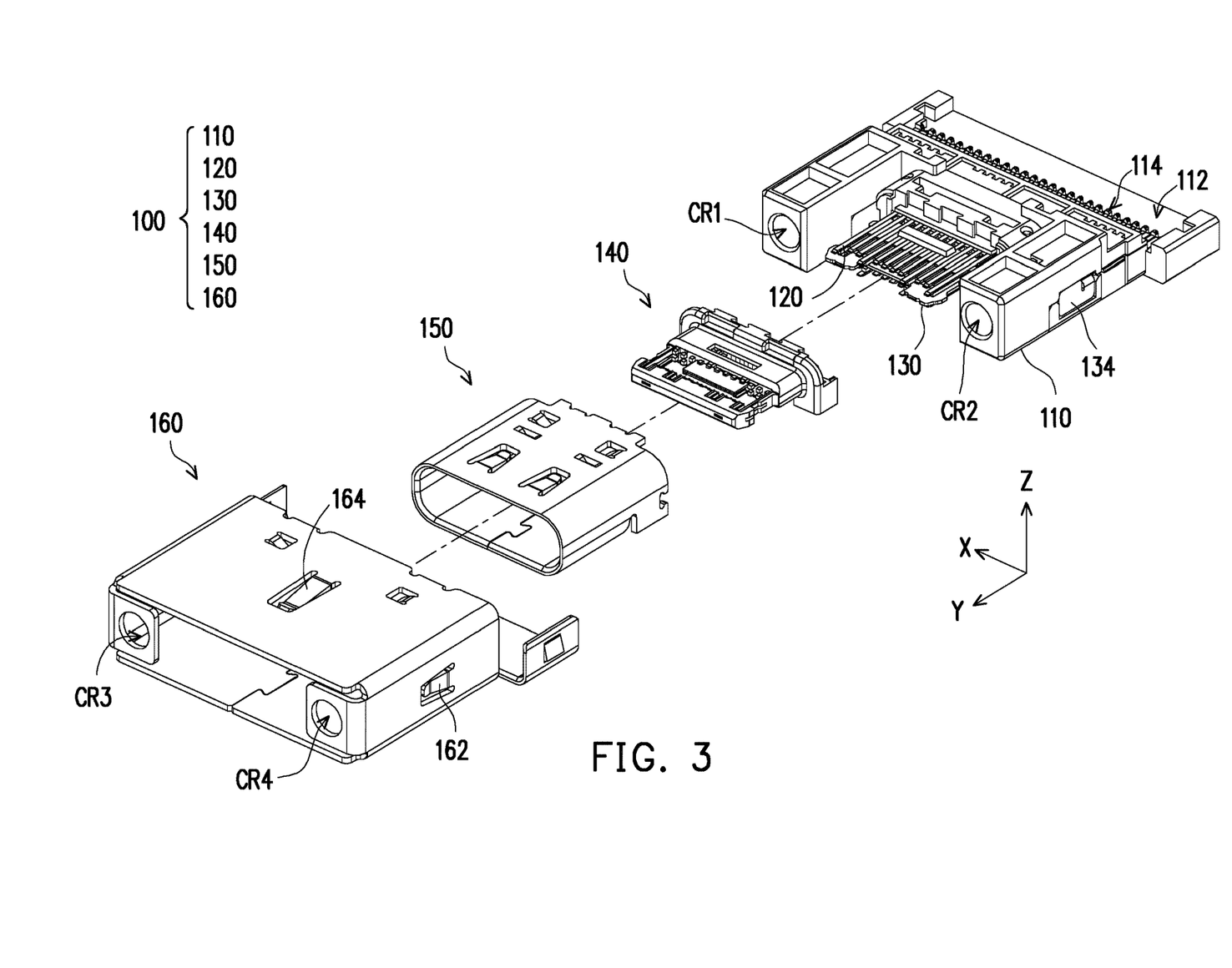
FIG. 3 and FIG. 4 are respectively exploded views of different degrees illustrating the electrical connector of FIG. 2.
Figure 4:
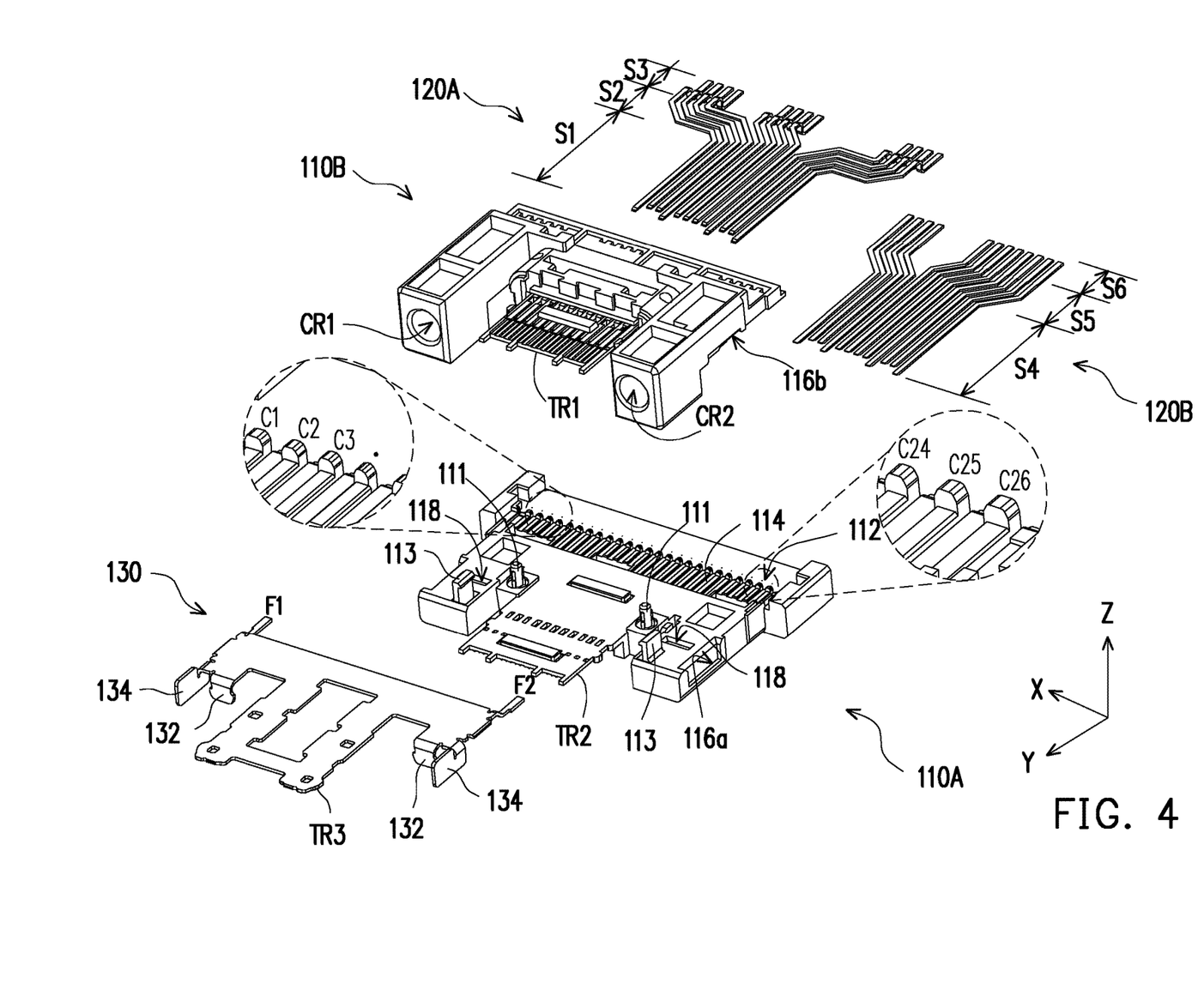

FIG. 1 and FIG. 2 respectively illustrate an electrical connector according to an embodiment of the invention from different viewing angles. FIG. 3 and FIG. 4 are respectively exploded views of different degrees illustrating the electrical connector of FIG. 2. A Cartesian coordinate axes X-Y-Z are also provided here to facilitate description of relevant components. Referring to FIG. 1 to FIG. 3 first, in the present embodiment, an electrical connector 100 is, for example, a USB Type-C connector and includes a base member 110, a plurality of first terminals 120, a sleeve member 140, a first shielding shell 160, and a second shielding shell 150, wherein the first terminals 120 are disposed in the base member 110, the sleeve member 140 is molded around a part of the base member 110, the second shielding shell 150 is fit around the sleeve member 140, and the first shielding shell 160 is fit around the base member 110.

Then, referring to FIG. 3 and FIG. 4, particularly, in FIG. 4, in the present embodiment, the first terminals 120 are further divided into a terminal group 120A and a terminal group 120B, and the base member 110 includes a first portion 110A and a second portion 110B that are assembled together along a Z-axis. The terminal group 120A and the terminal group 120B respectively pass through the second portion 110B and the first portion 110A. Here, the terminal groups 120A and 120B, and the second portion 110B, and the first portion 110A are, for example, respectively formed by injection molding, and then the terminal groups 120A and 120B are assembled together along with the first portion 110A and the second portion 110B.

Figure 5:
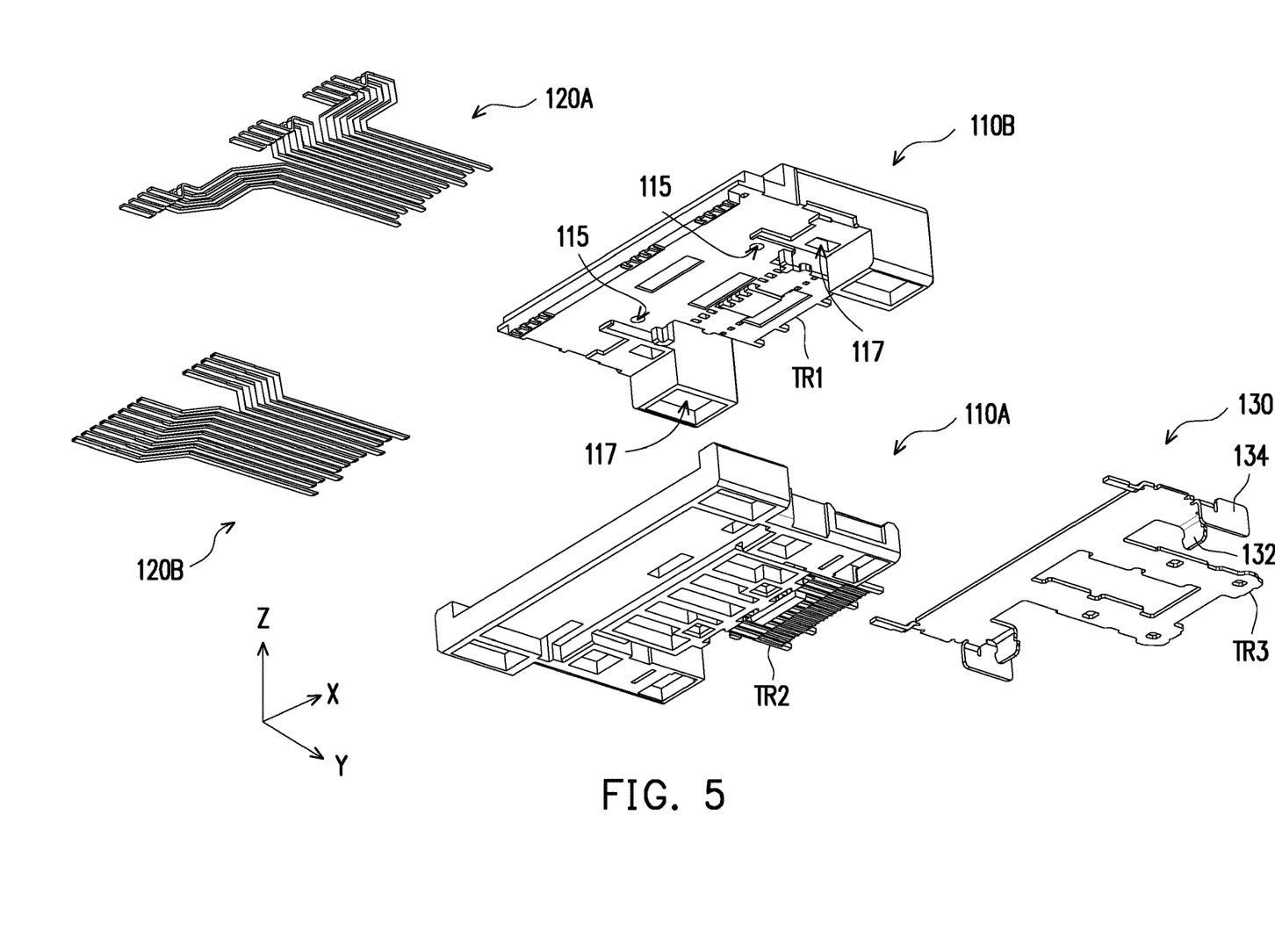
FIG. 5 illustrates the exploded view of FIG. 4 from another angle of view.

FIG. 5 illustrates the exploded view of FIG. 4 from another angle of view. Referring to FIG. 3 to FIG. 5 at the same time, the electrical connector 100 of the present embodiment further includes a shielding plate 130 that is disposed in the base member 110 and is substantially sandwiched between the first portion 110A and the second portion 110B. As shown in FIG. 4 and FIG. 5, protruding columns 111, buckle portions 113, and slots 118 are disposed on two opposite sides of a tongue TR2 on the first portion 110A, openings 115 and slots 117 are disposed on two opposite sides of a tongue TR1 on the second portion 110B, and the shielding plate 130 includes bending protrusions 132 located on two opposite sides of a tongue TR3. Accordingly, through the positioning effect provided by the protruding columns 111 and the openings 115 and the buckling effect provided by the buckle portions 113 and the slots 117, the first portion 110A and the second portion 110B are successfully assembled together, and the shielding plate 130 is successfully sandwiched between the first portion 110A and the second portion 110B through corresponding combination of the bending protrusions 132 and the slots 118.

In other words, after the assembly as shown in FIG. 4 and FIG. 5, the electrical connector 100 may undergo subsequent assembly operations as shown in FIG. 3, namely, fitting the sleeve member 140 around the tongues TR1, TR2, and TR3, combining the second shielding shell 150 and the base member 110 to cover the tongues TR1, TR2, and TR3, and finally assembling the first shielding shell 160 to the base member 110 and covering the base member 110 and the components therein including the terminals, the sleeve member 140, and the second shielding shell 150 in the first shielding shell 160.

In the present embodiment, the second portion 110B of the base member 110 has channels CR1, CR2, and the first shielding shell 160 has openings CR3, CR4 respectively corresponding to the channels CR1, CR2 to form locking hole structures. Accordingly, when the electrical connector 100 is abutted to an external electronic device 200, a locking member (not illustrated) can be locked into the electrical connector 100 from the external electronic device 200 to fix the two together.

Moreover, the first portion 110A further has recesses 116a located on lateral sides, the second portion 110B further has recesses 116b located on lateral sides, and the shielding plate 130 further includes lateral wings 134. Therefore, when the first portion 110A, the second portion 110B, and the shielding plate 130 are assembled together, the lateral wings 134 are positioned in the recesses 116a, 116b and are exposed out of the base member 110. Accordingly, when the first shielding shell 160 is assembled to the base member 110, elastic pieces 162 located on lateral sides of the first shielding shell 160 structurally abut against the lateral wings 134, thereby achieving the effect of electrical conduction. As a result, the shielding plate 130 and the first shielding shell 160 are collectively electrically grounded, thereby providing the effect of electromagnetic shielding. Furthermore, the first shielding shell 160 further includes an elastic piece 164 at its top portion to structurally abut against the second shielding shell 150 and form electrical conduction. Accordingly, the shielding plate 130, the first shielding shell 160, and the second shielding shell 150 are electrically connected, and the required effects of grounding and electromagnetic shielding are achieved.

Referring to FIG. 4 and FIG. 5 again, it is noted that the first terminals 120 are arranged along an X-axis, and each of the first terminals 120 is divided into different segments along a Y-axis. Specifically, each terminal of the terminal group 120A is divided into an contact segment S1, a bending segment S2, and an tail segment S3, and each terminal of the terminal group 120B is also divided into an contact segment S4, a bending segment S5, and an tail segment S6. Here, the contact segments S1, S4 are segments acting to enable the electrical connector 100 to be abutted to and in physical contact with the external electronic device 200, and, namely, are an abutting side E1 as shown in FIG. 1 and FIG. 2. Correspondingly, the tail segments S3, S6 enable the electrical connector 100 to be fixed and electrically connected to an electronic module, and, namely, are an electrically conducting side E2 as shown in FIG. 1 and FIG. 2. Here, the electronic module interconnected with the electrically conducting side E2 of the electrical connector 100 is, for example, a circuit board or a cable. Through the operation of abutting the electronic module to the external electronic device 200 via the electrical connector 100, the electrical connection or electrical disconnection between the electronic module and the external electronic device 200 is achieved.

Figure 6:
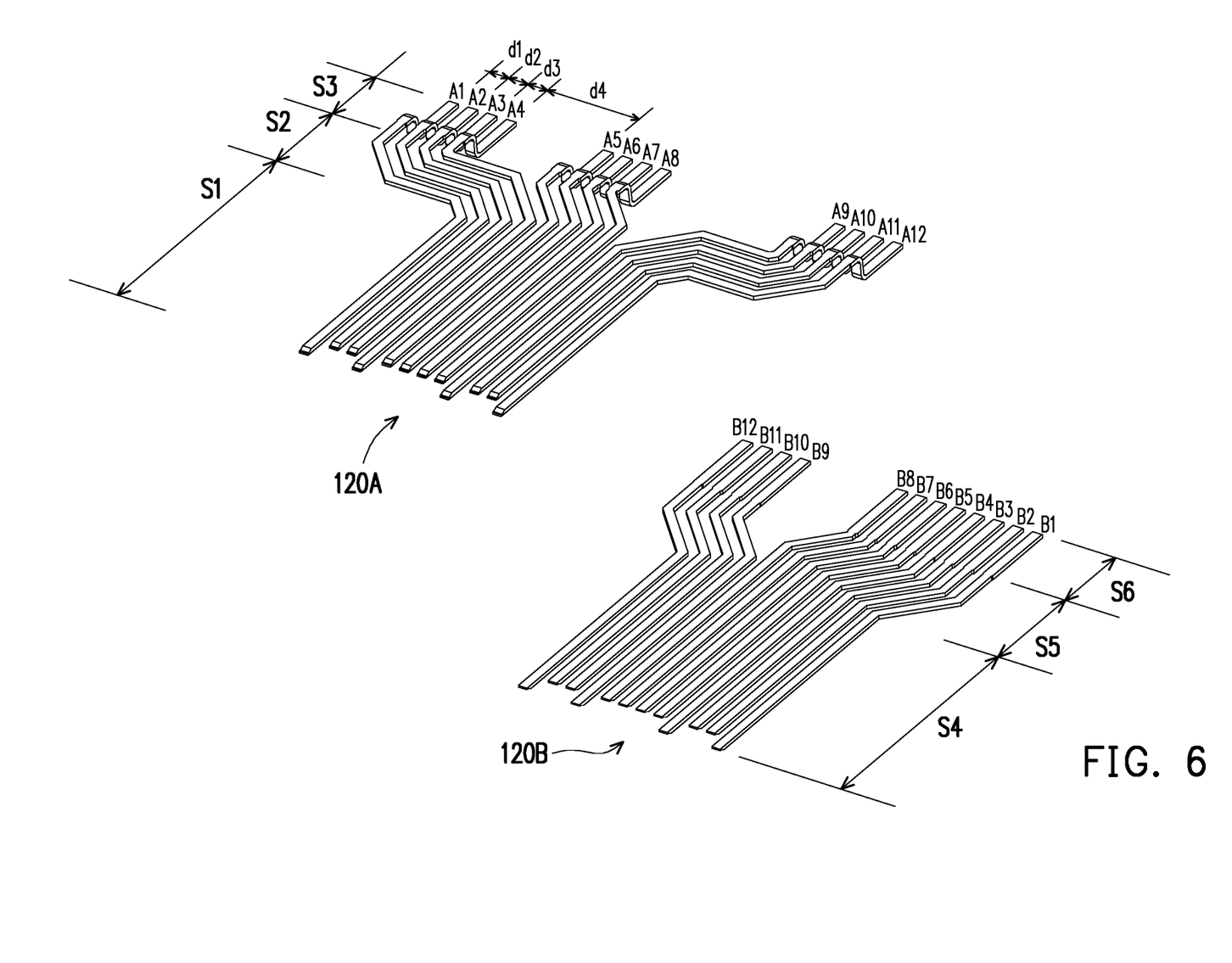
FIG. 6 is an enlarged schematic diagram illustrating terminals of FIG. 4.
Figure 7:
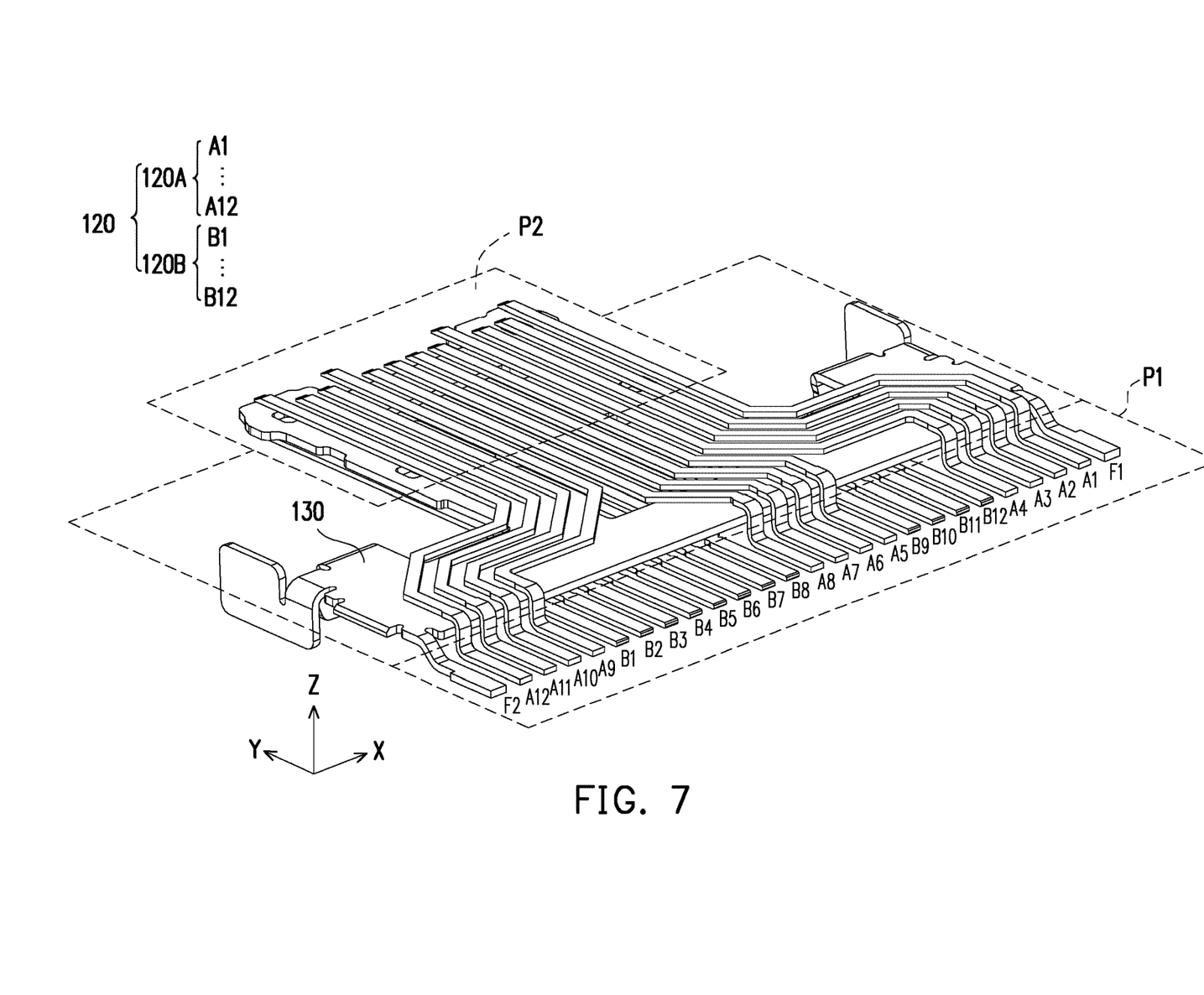
FIG. 7 is a schematic diagram illustrating part of components of the electrical connector.

FIG. 6 is an enlarged schematic diagram illustrating the terminals of FIG. 4. Here, positions and arrangements of the terminals shown in FIG. 6 are all identical to those in FIG. 4. FIG. 7 is a schematic diagram illustrating part of components of the electrical connector. Referring to FIG. 4, FIG. 6, and FIG. 7 at the same time, in the present embodiment, the contact segments S1, S4 correspond to each other along the Z-axis. In other words, the first terminals 120 respectively belong to two different parallel planes P1, P2 on the abutting side E1, and the planes P1, P2 are parallel to an X-Y plane, so that the first terminals 120 can be compatible with the USB Type-C connector specifications in the contact segments S1, S4. However, the electrically conducting side E2 of the electrical connector 100 is not specifically limited and may vary according to different use requirements. Here, to make the electrical connector 100 easy for a user to hold and operate, it is not specifically limited to be configured in the same manner as the contact segments S1, S4. Therefore, in the present embodiment, in the tail segments S3, S6, the first terminals 120 are substantially arranged similarly along the X-axis and are located on the same plane P1, and are thus arranged in a widened contour where a dimension of the tail segments S3, S6 along the X-axis is greater than a dimension of the contact segments S1, S4 along the X-axis.

In this embodiment, the contact segment S4, the bending segment S5, and the tail segment S6 of the terminal group 120B are substantially all located on the same plane P1. Therefore, in the manufacturing process, it is only necessary to provide a stage along the Z-axis in the bending segment S2 of the terminal group 120A. However, the embodiments of the invention are not limited hereto. In another unillustrated embodiment, it is also possible that the stage along the Z-axis is provided in both of the bending segments S2, S5 of the terminal groups 120A, 120B.

In the base member 110, the tail segments S3, S6 of the first terminals 120 are located on a seat 112 of the first portion 110A, and the first portion 110A further includes a plurality of spacers 114 disposed on the seat 112 to further form a plurality of guiding grooves on the seat 112, such that the tail segments S3, S6 are both located in the guiding grooves and are spaced apart by the spacers 114. Meanwhile, by exposing the tail segments S3, S6 out of the base member 110, a processing space required for performing conductive soldering on the electrical connector 100 and the electronic module is provided.

Next, referring to FIG. 6 and FIG. 7, in the present embodiment, the first terminals 120 are further numbered, and the terminal group 120A includes terminals A1 to A12, and the terminal group 120B includes terminals B1 to B12.

Particularly, in the terminal group 120A, the terminals A1 to A4 are sequentially a ground terminal, super speed differential terminals Tx1+/Tx1−, and a power terminal, and the terminals A9 to A12 are sequentially a power terminal, super speed differential terminals Rx2−/Rx2+, and a ground terminal. In other words, in the tail segment S3, the terminal group 120A forms a plurality of terminal sets (namely, the terminals A1 to A4 are regarded as a terminal set, and the terminals A9 to A12 are regarded as another terminal set). Moreover, in the terminal set (the terminals A1 to A4), the super speed differential terminals (the terminals A2, A3) are disposed between the ground terminal (the terminal A1) and the power terminal (the terminal A4). In other words, the terminals A1 to A4 are adjacent to each other and are arranged at an equal interval (distance d1=distance d2=distance d3), such that the terminal A1 and the terminal A4 are respectively closely adjacent to two opposite sides of the terminals A2, A3. Then, the terminal A5 is arranged on one side of the terminal A4 by a distance d4, and the distance d4 is greater than the distances d1, d2, d3.

Accordingly, in the terminal set consisting of the terminals A1 to A4, the configuration described above prevents a super speed differential signal from being disturbed by a power signal and noise, which may cause signal distortion or affect properties of high-frequency signals.

Similarly, in the other terminal set consisting of the terminals A9 to A12, the super speed differential terminals (the terminals A10, A11) are disposed between the ground terminal (the terminal A12) and the power terminal (the terminal A9), and the terminals A9 to A12 are also arranged at an equal interval and can thus exhibit the same effect.

On the other hand, in the tail segment S6, the terminal group 120B also has the same configuration as the terminal group 120A. Namely, in the terminal set consisting of the terminals B1 to B4, the terminal B1 is a ground terminal, the terminals B2, B3 are super speed differential terminals Tx2+/Tx2− and the terminal B4 is a power terminal. The terminals B9 to B12 are also in the same configuration, wherein the terminal B9 is a power terminal, the terminals B10, B11 are super speed differential terminals Rx1−/Rx1+, and the terminal B12 is a ground terminal. Therefore, the same effect as described above is also exhibited.

In light of the above, in the first terminals 120 of the present embodiment, the tail segments S3, S6 are configured in a specific arrangement, i.e., forming the plurality of terminal sets, in which each terminal set is formed of a ground terminal, a pair of super speed differential terminals, and a power terminal. In other words, the pair of super speed differential terminals are closely adjacent to the ground terminal and the power terminal in an arrangement axial direction. Therefore, disturbance caused by other electrical signals can be prevented when a high speed signal is transmitted.

Here, as shown in FIG. 4 and FIG. 6, in the present embodiment, the guiding grooves formed by the spacers 114 are further number as C1 to C26 and are arranged corresponding to the first terminals 120. Correspondences and electrical pin definitions as shown in the table below are thus formed to be used as supplementary information to the drawings:

| C1 | C2 | C3 | C4 | C5 | C6 | C7 | C8 | C9 | C10 |
|----|----|----|----|----|----|----|----|----|-----|
| F1 | A1 | A2 | A3 | A4 | B12 | B11 | B10 | B9 | A5 |
| GND | GND | Tx1+ | Tx1− | Vbus | GND | Rx1+ | Rx1− | Vbus | CC1 |

-continued

| C11 | C12 | C13 | C14 | C15 | C16 | C17 | C18 | C19 | C20 |
|-----|-----|-----|-----|------|-----|-----|-----|-----|-----|
| A6  | A7  | A8  | B8  | B7  | B6  | B5  | B4  | B3  | B2  |
| D+  | D−  | SBU1| SBU2| D−  | D+  | CC2 | Vbus| Tx2−| Tx2+|

| C21 | C22 | C23 | C24 | C25 | C26 |
|-----|-----|-----|-----|-----|-----|
| B1  | A9  | A10 | A11 | A12 | F2  |
| GND | Vbus| Rx2−| Rx2+| GND | GND |

According to the table above, the terminals A1 to A4, the terminals B1 to B4, the terminals B9 to B12, and the terminals A9 to A12 form four different terminal sets of the first terminals 120 in the tail segments S3, S6.

Moreover, the first terminals 120 further include a plurality of pairs of USB 2.0 differential terminals (the terminals A6, A7, B6, B7), a plurality of configuration channel (CC) terminals (the terminals A5, B5), and a plurality of sideband use (SBU) terminals (the terminals A8, B8). Meanwhile, in the arrangement direction along the X-axis, the plurality of terminal sets are substantially located on two opposite sides of the USB 2.0 differential terminals, the configuration channel terminals, and the sideband use terminals. In other words, the terminal sets are symmetrically located on the two sides of the tail segments S3, S6.

It is noted that the shielding plate 130 further includes second terminals F1, F2 respectively disposed on two opposite sides of the first terminals 120 along the X-axis, and the second terminals F1, F2 and the tail segments S3, S6 are both located on the plane P1. Here, the second terminals F1, F2 are configured to be electrically connected to a ground terminal of the electronic module, such that after the electrical connector 100 and the electronic module are fixed to each other, the ground terminal of the electronic module (e.g., a ground pad of the circuit board or a ground layer of the cable) can be collectively grounded along with the shielding plate 130, the first shielding shell 160, and the second shielding shell 150.

Figure 8:
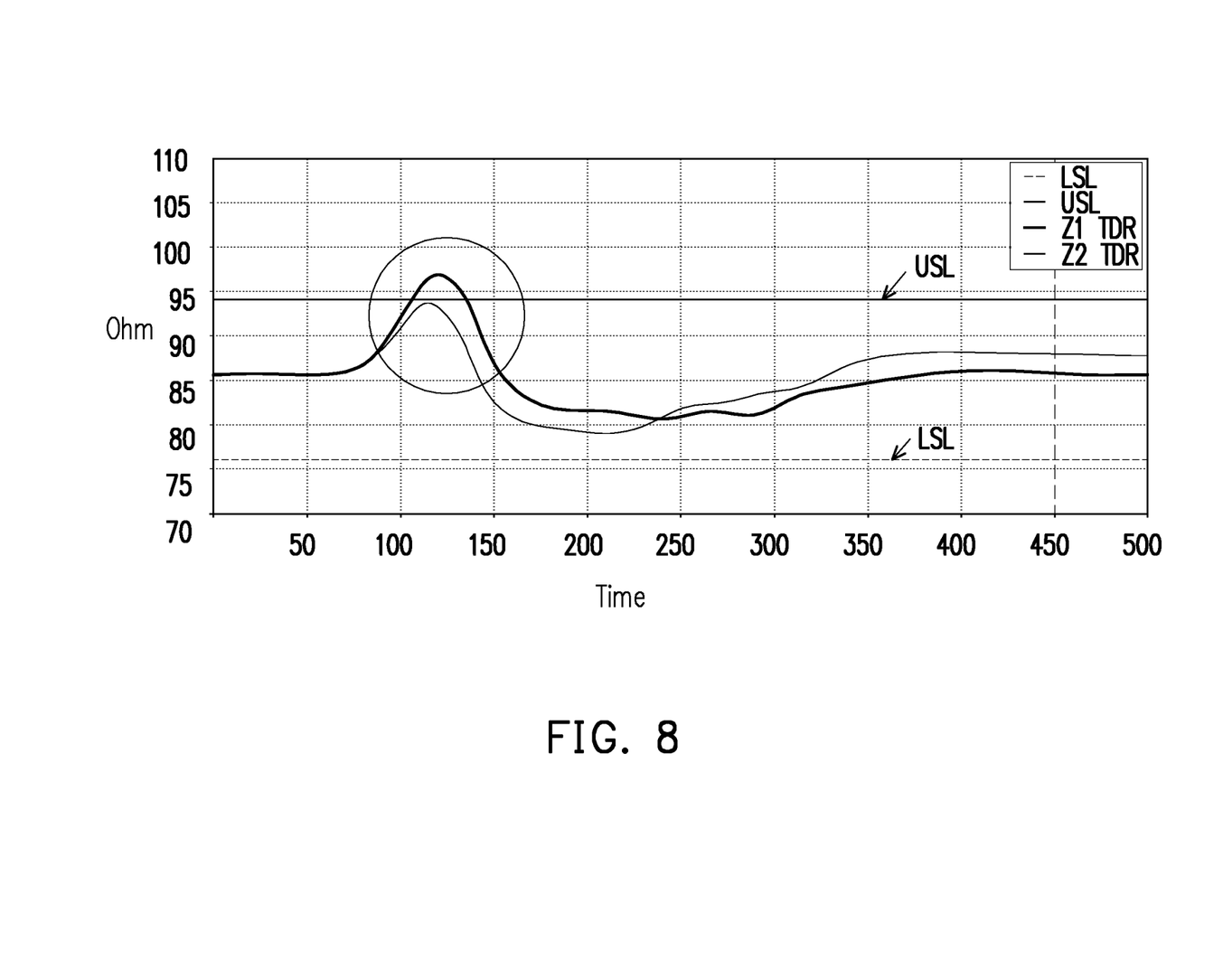
FIG. 8 and FIG. 9 are schematic diagrams illustrating impedances generated corresponding to different terminal configurations.
Figure 9:
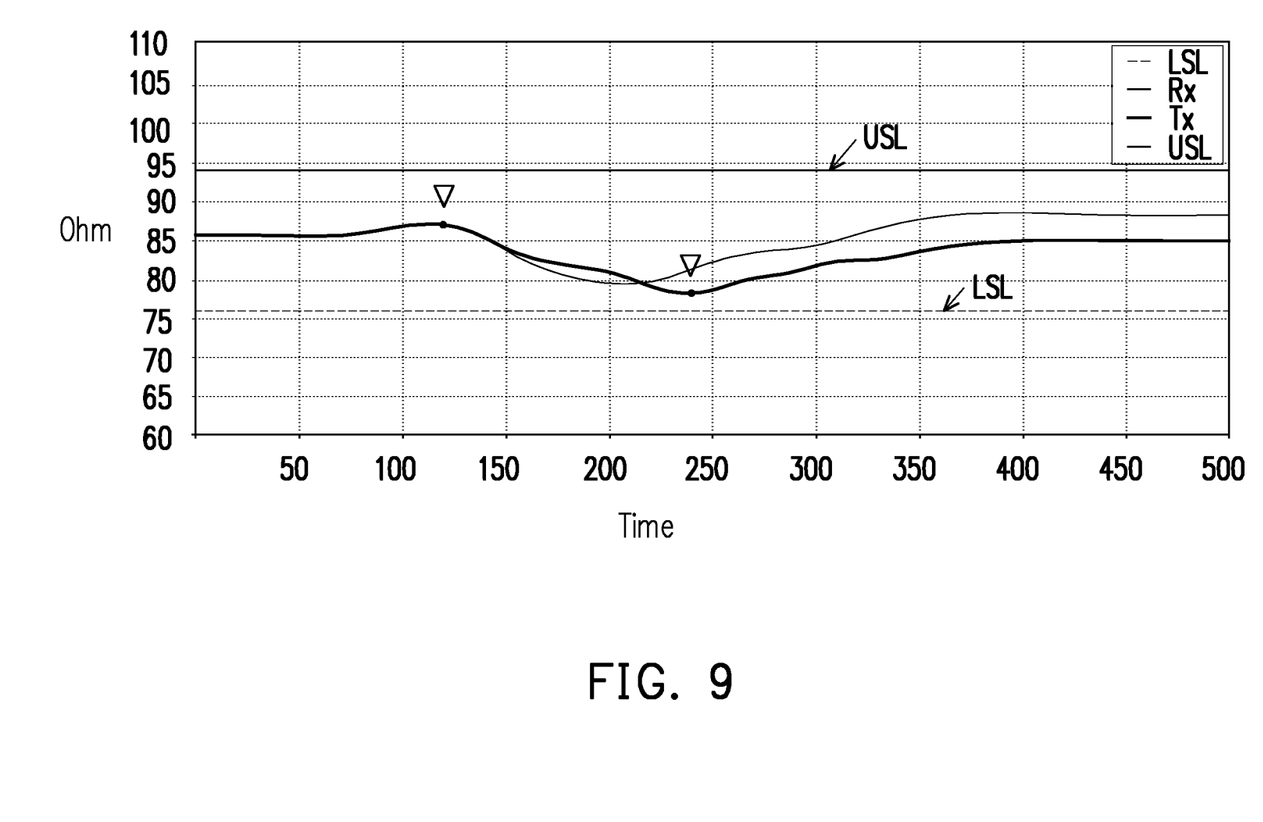

FIG. 8 and FIG. 9 are schematic diagrams illustrating impedances generated corresponding to different terminal configurations. Referring to FIG. 8 and FIG. 9 at the same time, FIG. 8 illustrates signal transmission effect generated by a configuration of terminals in tail segments according to related art, and FIG. 9 illustrates signal transmission effect generated by the configuration of the first terminals 120 in the tail segments S3, S6 according to the present embodiment. In other words, FIG. 8 represents the case where the power terminal and the ground terminal are not disposed beside the super speed differential terminals. Therefore, when a high speed signal is transmitted, the impedance value experiences a surge at an NG point as shown in FIG. 8 (i.e., the circled portion in FIG. 8). In contrast, FIG. 9 represents the case of the terminal sets of the embodiments of the invention, in which the ground terminal and the power terminal are closely adjacent to the super speed differential terminals. Therefore, the surge mentioned above does not occur, which means that due to the terminal configuration, the high speed signal is not disturbed during transmission. Specifically, Z1 and Z2 respectively represent impedance curves at a transmission terminal Tx and a reception terminal Rx over time, LSL represents an upper limit of impedance, and USL represents a lower limit of impedance. The occurrence and non-occurrence of the surge in the impedance is used to determine whether disturbance is generated during signal transmission. According to FIG. 9, the surge does not occur in the embodiments of the invention, and the upper limit and the lower limit are not exceeded.

In summary of the above, in the embodiments of the invention, in the electrical connector, the terminals are specifically configured in the tail segments. Namely, in the arrangement axial direction of the tail segments, the two opposite sides of the super speed differential terminals are first disposed with the power terminal and the ground terminal rather than other terminals (i.e., forming the plurality of terminal sets in the tail segments). Moreover, each terminal set is formed of the ground terminal, the super speed differential terminals, and the power terminal that are sequentially arranged. Accordingly, since the super speed differential terminals are disposed between the ground terminal and the power terminal, disturbance of the power signal and other noise, which may cause signal distortion or affect properties of high-frequency signals, can thus be effectively prevented.

Moreover, through the second terminals provided by the shielding plate, an electrical conducting circuit is further formed with the electronic module connected to the electrical connector and the shielding plate, the first shielding shell, and the second shielding shell of the electrical connector, thereby achieving the collective grounding effect. Due to the grounding effect, such configuration further enhances properties of the high speed signal and meanwhile provides sufficient electromagnetic shielding for the terminals to effectively prevent issues such as radio-frequency interference (RFI) and crosstalk.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:
1. An electrical connector comprising:
a base member;
a plurality of first terminals disposed in the base member, wherein each of the first terminals comprises a contact segment and a tail segment opposite to each other, the electrical connector is removably connected to an external electronic device via the contact segments, the contact segments of a first group of the first terminals is located on a first plane, the contact segments of a second group of the first terminals is located on a second plane, the first plane and the second plane are different parallel planes, and the tail segments of the first group of the first terminals and the tail segments of the second group of the first terminals are located on a same plane, wherein the first terminals form a plurality of terminal sets in the tail segments, and each of the terminal sets comprises a ground terminal, a pair of super speed differential terminals, and a power terminal which are adjacent to each other and are sequentially arranged; and a shielding plate disposed on the base member and located between the first plane and the second plane on which the contact segments are located, wherein the shielding plate comprises at least one second terminal, and a tail segment of the second terminal arranged on the same plane, wherein the tail segment of the second terminal of the shielding plate and the tail segments of the first terminals are all arranged in a same row and on the same plane, all the tail segments of the first terminals are closely adjacent to each other in an arrangement axial direction, wherein the contact segments of the second group of the first terminals and the tail segments of the second group of the first terminals are located on a same plane.

2. The electrical connector according to claim 1, wherein the terminals of each of the terminal sets are arranged at an equal interval.

3. The electrical connector according to claim 1, wherein the pair of super speed differential terminals is a pair of Tx+/Tx− terminals or a pair of Rx+/Rx− terminals.

4. The electrical connector according to claim 1, wherein the electrical connector is a USB Type-C connector.

5. The electrical connector according to claim 1, wherein the first terminals further comprise a plurality of pairs of USB 2.0 differential terminals, a plurality of configuration channel (CC) terminals, and a plurality of sideband use (SBU) terminals, and the terminal sets are located on two opposite sides of the plurality of pairs of USB 2.0 differential terminals, the plurality of configuration channel terminals, and the plurality of sideband use terminals.

6. The electrical connector according to claim 1, wherein the terminal sets are symmetrically located on two sides of the tail segments.

7. The electrical connector according to claim 1, wherein the shielding plate comprises a pair of second terminals located on two opposite sides of the tail segments.

8. The electrical connector according to claim 1, wherein the base member comprises:
a first portion, wherein a part of the first terminals pass through the first portion, the first portion comprises a seat, and the tail segments are located on the seat; and
a second portion assembled to the first portion and exposing the seat, wherein another part of the first terminals pass through the second portion.

9. The electrical connector according to claim 8, wherein the first portion comprises a plurality of spacers disposed on the seat, and the tail segments are spaced apart by the spacers.

10. The electrical connector according to claim 8, wherein-the shielding plate is sandwiched between the first portion and the second portion, wherein the base member comprises a recess, and the shielding plate comprises a lateral wing located in the recess and exposed out of the base member.

11. The electrical connector according to claim 10, further comprising:
a first shielding shell fit around and covering the base member and the shielding plate, wherein the first shielding shell electrically abuts against the lateral wing.

12. The electrical connector according to claim 11, further comprising:
a second shielding shell fit around a tongue of the first portion, a tongue of the second portion, and a tongue of the shielding plate, wherein the second shielding shell is located inside the first shielding shell and electrically abuts against the first shielding shell.

13. An electrical connector comprising:
a base member;
a plurality of first terminals disposed in the base member, wherein each of the first terminals comprises a contact segment and a tail segment opposite to each other, the contact segments of a first group of the first terminals is located on a first plane, the contact segments of a second group of the first terminals is located on a second plane, the first plane and the second plane are different parallel planes, and the tail segments of the first group of the first terminals and the tail segments of the second group of the first terminals are located on a same plane; and
a shielding plate disposed on the base member and located between the first plane and the second plane on which the contact segments are located, wherein the shielding plate comprises at least one second terminal, and a tail segment of the second terminal arranged on the same plane, wherein the tail segment of the second terminal of the shielding plate and the tail segments of the first terminals are all arranged in a same row and on the same plane,
wherein the contact segments of the second group of the first terminals and the tail segments of the second group of the first terminals are located on a same plane.

14. The electrical connector according to claim 13, wherein the first terminals form a plurality of terminal sets in the tail segments, and each of the terminal sets comprises a ground terminal, a pair of super speed differential terminals, and a power terminal which are adjacent to each other and are sequentially arranged.

15. The electrical connector according to claim 14, wherein the terminals of each of the terminal sets are arranged at an equal interval.

16. The electrical connector according to claim 14, wherein the pair of super speed differential terminals is a pair of Tx+/Tx− terminals or a pair of Rx+/Rx− terminals.

17. The electrical connector according to claim 14, wherein the terminal sets are symmetrically located on two sides of the tail segments.

18. The electrical connector according to claim 13, wherein the electrical connector is a USB Type-C connector.

* * * * *